US009356322B2

(12) United States Patent
Park et al.

(10) Patent No.: US 9,356,322 B2
(45) Date of Patent: May 31, 2016

(54) RECHARGEABLE BATTERY PACK (71) Applicant: Samsung SDI Co., Ltd., Yongin-si, Gyeonggi-Do (KR)

(72) Inventors: Kyung-Ho Park, Yongin-si (KR); Seok Koh, Yongin-si (KR)

(73) Assignee: Samsung SDI Co., Ltd., Gyeonggi-do (KR)

( * ) Notice: Subject to any disclaimer, the term of this patent is extended or adjusted under 35 U.S.C. 154(b) by 253 days.

(21) Appl. No.: 14/085,633

(22) Filed: Nov. 20, 2013

(65) Prior Publication Data

US 2014/0220390 A1    Aug. 7, 2014

(30) Foreign Application Priority Data

Feb. 6, 2013    (KR) .................. 10-2013-0013421

(51) Int. Cl.
  *H01M 2/10*    (2006.01)
  *H01M 10/42*    (2006.01)
(52) U.S. Cl.
  CPC .......... *H01M 10/425* (2013.01); *H01M 2/1061* (2013.01)
(58) Field of Classification Search
  None
  See application file for complete search history.

(56) References Cited

U.S. PATENT DOCUMENTS

2002/0044514 A1* 4/2002 Aizawa ................. G11B 17/046
                                                              720/650
2008/0292955 A1  11/2008 Byun et al.
2008/0305367 A1* 12/2008 Baek .................... H01M 2/0215
                                                              429/7
2008/0318119 A1* 12/2008 Watanabe ............ B60L 11/1874
                                                              429/99
2009/0305117 A1* 12/2009 Koh ..................... H01M 10/425
                                                              429/61
2010/0092861 A1*  4/2010 Kim ........................ H01M 2/34
                                                              429/178
2012/0070716 A1*  3/2012 Yoshioka ................. B60K 1/04
                                                              429/156
2012/0208052 A1   8/2012 Kim
2012/0257349 A1* 10/2012 Bang ................... H01M 10/425
                                                              361/679.55

FOREIGN PATENT DOCUMENTS

KR    10-2008-0103652 A    11/2008
KR    10-2012-0092368 A    8/2012

* cited by examiner

*Primary Examiner* — Patrick Ryan
*Assistant Examiner* — Wyatt McConnell
(74) *Attorney, Agent, or Firm* — Knobbe Martens Olson & Bear LLP (57) ABSTRACT

A rechargeable battery pack configured to prevent a frame from being damaged due to external impact forces while insulating a protection circuit module from short circuit is described. In an exemplary embodiment, the rechargeable battery pack may include a plurality of unit cells made up of a rechargeable battery connected to a frame which accommodates and supports the unit cells and having a loading portion sandwiched between the unit cells. The rechargeable battery pack may further comprise an electrically insulating holder connected to a loading portion, and a protection circuit module electrically connected to the unit cells and installed into the holder.

12 Claims, 8 Drawing Sheets

RECHARGEABLE BATTERY PACK

CROSS-REFERENCE TO RELATED APPLICATIONS

This application claims priority to and the benefit of Korean Patent Application No. 10-2013-0013421 filed in the Korean Intellectual Property Office on Feb. 6, 2013, the entire contents of which are incorporated herein by reference. Any and all priority claims identified in the Application Data Sheet, or any correction thereto, are hereby incorporated by reference under 37 CFR 1.57.

BACKGROUND

1. Field

The disclosed technology relates to a rechargeable battery pack, and particularly to a rechargeable battery pack for a portable computing device.

2. Description of the Related Technology

Unlike a primary battery, a rechargeable battery can be recharged and discharged repeatedly. Small-capacity rechargeable batteries are used for small portable electronic devices such as mobile phones, notebook computers, camcorders, tablet computers, and the like. Large-capacity rechargeable batteries are used as a motor-driving power source for electric bicycles, scooters, electric vehicles, fork lifts, and the like.

Rechargeable battery are often formed as a pack using individual battery cells and related components. The rechargeable battery may be used as a pack electrically connecting a plurality of unit cells. For example, the rechargeable battery pack includes a plurality of unit cells, a protection circuit module (PCM) that electrically connects the unit cells and protects the cells, and a frame to accommodate the unit cells.

A plurality of pouch type unit cells may be coupled in series or parallel to form a tablet type rechargeable battery pack. The rechargeable battery pack is formed by accommodating a plurality of unit cells and a protection circuit module that electrically connects the unit cells in a frame.

In order to prevent short-circuiting of the protection circuit module in a rechargeable battery pack, the frame is formed of synthetic resin materials and a loading portion to load the protection circuit module is provided on one side of the frame. Thus, when subjected to an external impact the frame may be easily damaged due to its lack of the strength. In addition, when the rechargeable battery pack is mounted, the frame may be easily damaged due to the fastening force of a screw.

The information disclosed in this Background section is only for enhancement of understanding of the background of the described technology.

SUMMARY OF CERTAIN INVENTIVE ASPECTS

In an exemplary embodiment described herein, a rechargeable battery pack is configured to prevent a frame from being damaged due to external impact forces while a protection circuit module is prevented from being short-circuited.

In one aspect, a rechargeable battery pack, comprises a plurality of unit cells; a frame comprising a loading portion disposed thereon, wherein the frame is configured to support the plurality of unit cells, and wherein the loading portion is disposed at a junction between two of the plurality of unit cells; an electrically insulating holder connected to the loading portion; and a protection circuit module electrically connected to the unit cells and connected to the holder, the holder providing electrical insulation between the loading portion and the protection circuit module; and wherein the frame has a higher strength than the holder.

In some embodiments, the frame is formed of a metal material, and the holder is formed of a synthetic resin material.

In some embodiments, the loading portion is formed with a plurality of first through holes therethrough.

In some embodiments, the holder is formed with a plurality of second through holes therethrough.

In some embodiments, the loading portion comprises a locking protrusion extending away from the first through hole, and wherein the holder comprises locking grooves disposed in at least one of the second through holes, the locking grooves configured to receive the locking protrusion.

In some embodiments, the frame comprises a layer of an insulating material.

In some embodiments, the frame comprises a quadrangle, having a pair of long sides parallel to each other, and a pair of short sides parallel to each other, wherein the end portions of the pair of long sides are connected to the end portions of the short sides, and the loading portion is disposed perpendicular to the pair of long sides at approximately the center of the quadrangle.

In some embodiments, the unit cells includes a first unit cell and a second unit cell each of the first unit cell and the second unit cell comprising a positive and a negative electrode lead tab, and wherein each of lead tabs of the first unit cell and the second unit cell is connected to the protection circuit module.

In some embodiments, the rechargeable battery pack further comprises an insulating tape attached over the first unit cell and the second unit cell.

In some embodiments, at least one of the long sides and one of the short sides comprises a side portion to support a side surface of the unit cell, a supporting portion protruding from the side portion toward the inner side to support one side of the unit cell, and a set installing portion protruded from the side portion toward the outer side, the set installing portion configured to install in a mobile electronic device.

In some embodiments, the rechargeable battery pack further comprises a double-sided adhesive tape interposed between one side of the supporting portion and the side portion and the unit cell.

In some embodiments, the double-sided adhesive tape is contoured to be attached with the supporting portion and the side portion to one side thereof and with one surface of the first unit cell to other side thereof.

In some embodiments, the set installing portion includes a screw hole.

In some embodiments, the unit cell is a pouch type electrochemical cell.

DETAILED DESCRIPTION

The disclosed technology will be described more fully hereinafter with reference to the accompanying drawings, in which exemplary embodiments of the invention are shown. As those skilled in the art would realize, the described embodiments may be modified in various different ways, all without departing from the spirit or scope of the present disclosure. The drawings and description are to be regarded as illustrative in nature and not restrictive Like reference numerals designate like elements throughout the specification.

Figure 1:
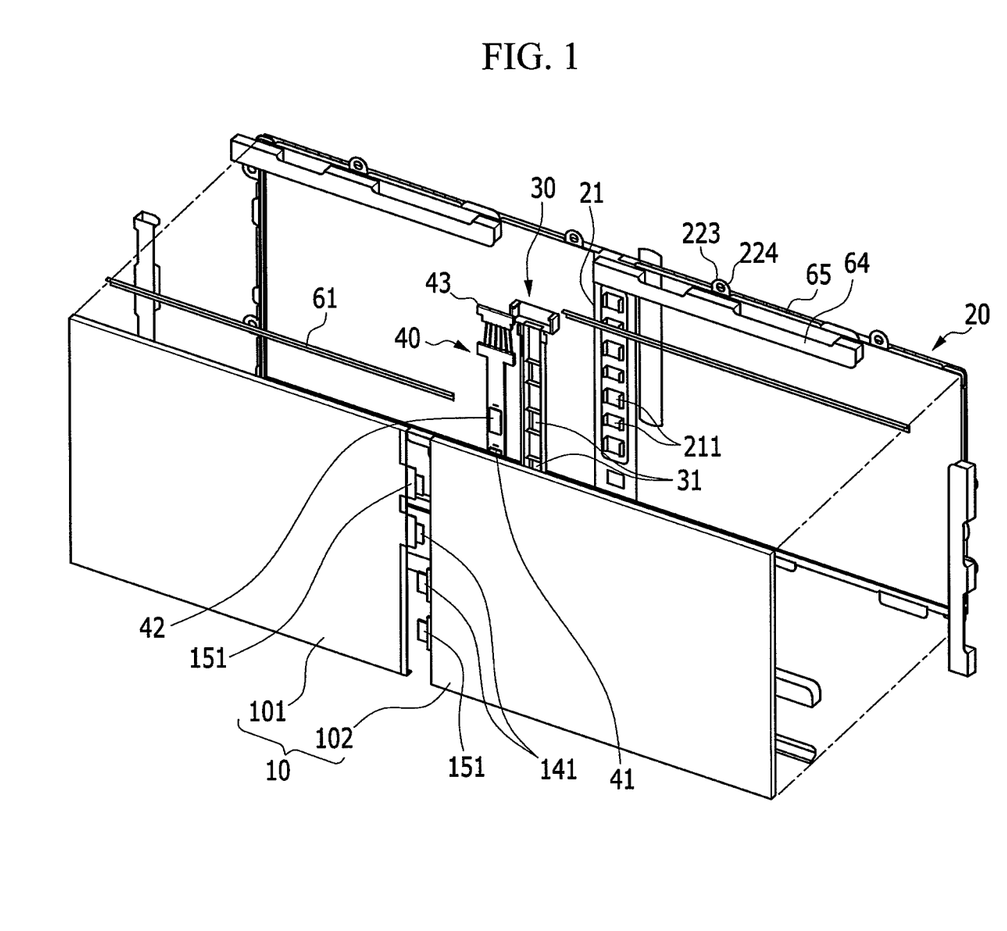
FIG. 1 is an exploded perspective view illustrating a rechargeable battery pack.
Figure 2:
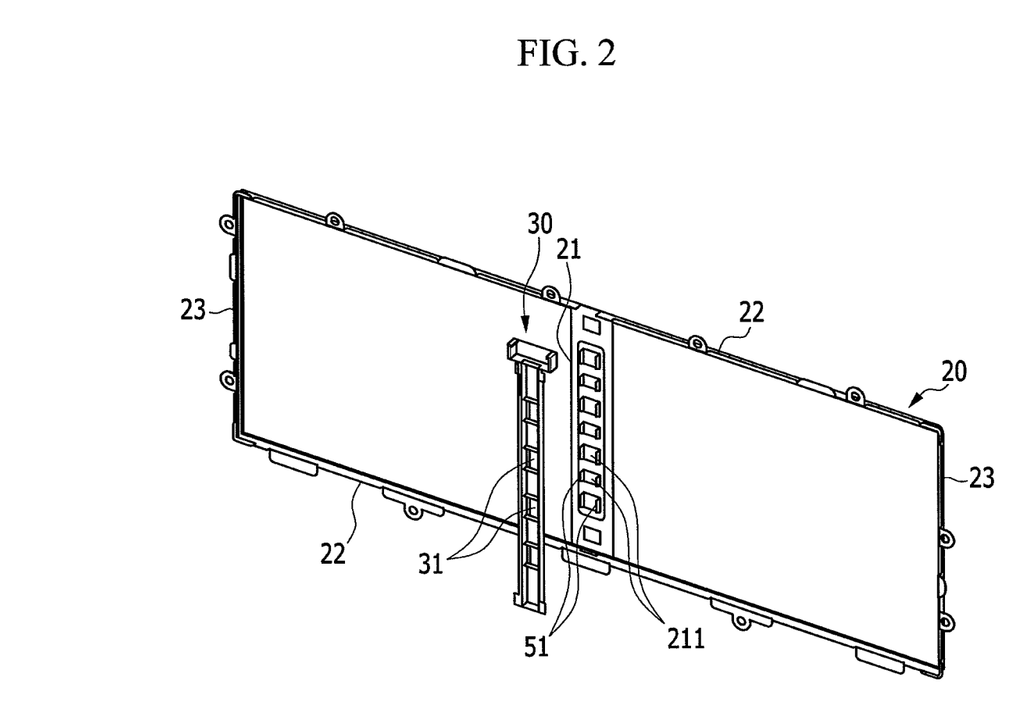
FIG. 2 is an exploded perspective view illustrating a frame used in FIG. 1.

FIG. 1 is an exploded perspective view illustrating a rechargeable battery pack. FIG. 2 is an exploded perspective view illustrating a frame used in FIG. 1. Referring to FIGS. 1 and 2, in the exemplary embodiment, a rechargeable battery pack includes a plurality of unit cells 10, a frame 20 for accommodating and supporting the unit cells 10. The frame 20 comprises a loading portion 21, a holder 30 installed in the loading portion 21, and a protection circuit module 40 installed into the holder 30. The protection circuit module 40 is electrically insulated from the loading portion 21 through the holder 30.

The unit cells 10 include a first unit cell 101 and a second unit cell 102 that are symmetrically loaded into the loading portion 21. For convenience, in the present exemplary embodiment, only two unit cells 10 are illustrated, but more unit cells may be provided. Although not described, even if four, six, or eight or more unit cells are applied, the plurality of unit cells may be disposed symmetrically on both sides of the frame 20, the frame 20 being sandwiched between the unit cells 10.

The frame 20 is formed as a structure that can accommodate and support the plurality of unit cells 10, and to provide a mechanical strength that protects unit cells 10 in the rechargeable battery pack. The holder 30 is connected to the loading portion 21. The holder 30 is sized and shaped to receive the protection circuit module 40 into a space that supports the protection circuit module 40 and insulates the protection circuit module 40 from the loading portion 21 and the frame 20. The holder 30 may be formed of electrically insulating material which provides electrical insulation between the protection circuit module 40 and the loading portion 21 and the frame 20. For example, the holder 30 may be formed of synthetic resin material, plastic, rubber, polymer, or any other desired electrically insulating material.

In some embodiments, the frame 20 is formed of materials having a higher mechanical strength and resistance to external impact than the holder 30. For example, the frame 20 may be formed of metal materials (e.g., stainless steel or aluminum), and the holder 30 may be formed of materials having a lower mechanical strength than the metal materials, such as those described above.

In some embodiments, the frame 20 is formed as a quadrangle having a pair of long sides 22 parallel to each other, and a pair of short sides 23 connecting end portions of the pair of long sides 22 to each other. Although a quadrangle is depicted herein, other shapes may be advantageously used as well. In some embodiments, the frame 20 may be formed of two smaller quadrangle portions, with the loading portion 21 connecting the two smaller portions of the frame 20 together. The frame 20 provides a continuous surface enclosed by the long sides 22 and the short sides 23. The frame 20 may be configured to have a raised border sized to receive the unit cells 10, or into which the unit cells 10 may be securely placed. In some embodiments, the frame comprises a set installing portion 223 having a set screw hole 224 formed therein. The set installing portion 223 may be used to secure the unit cells 10 to the frame 20. This will be described in greater detail below. The frame 20 may be in physical contact with the unit cells 10, and provide adequate surface to conduct heat generated by the unit cell 10 and to dissipated the conducted heat through the frame 20.

The loading portion 21 is disposed on frame 20, or between portions of frame 20, parallel to the short sides 23, and connects middle sections of the pair of long sides 22 to each other. The loading portion 21 provides structural rigidity to the frame 20 and provides a space for installation of the holder 30. In the rechargeable battery pack, the frame 20 enhances a mechanical strength, but it may be desirable to reduce the weight of the frame. Thus, in some embodiments, the loading portion 21 may comprise a plurality of through holes 211. The plurality of through holes may be bordered on opposing sides by one or more locking protrusions 51.

The holder 30 includes a plurality of through holes 31. The through holes 31 may be disposed on the holder 30 to correspond to the retaining tabs 212 of the loading portion. The retaining tabs 212 may be configured to extend through a portion of the through holes 31. The retaining tabs 212 may be sized to provide a friction fit within the through holes 31 to securely retain the holder 30 to the loading portion 21. The holder 30 is connected to the loading portion 21 of the frame 20 and provides electrical insulation from the loading portion 21 and the frame 20.

The protection circuit module 40 comprises a connector 43 which, when the protection circuit module 40 is connected to the holder 30, extends past the frame 20 such that the connector 43 can be connected to an electric or electronic device. The protection circuit module 40 comprises positive and negative electrode tab connection portions 41 and 42, which are configured and disposed to contact a positive electrode lead tab 141 and a negative electrode lead tab 151 of the unit cells 10, when the unit cells 10 are connected to the frame 20. The positive and negative electrode lead tabs 141 and 151 may be connected to the protection circuit module 40 by welding. With the protection circuit module 40 connected to the holder 30, when the positive and negative electrode lead tabs 141 and 151 of the unit cell 10 are in contact with the positive and negative electrode tab connection portions 41 and 42, welding can be performed by inserting a welding rod through the through holes 211 of the loading portion 21 and through holes 31 of the holder 30, and contacting the protection circuit module 40. By connecting the positive and negative electrode lead tabs 141 and 151 to the protection circuit module 40 via the positive and negative lead electrode connection portions 41 and 42, power can be supplied to or from the unit cells via connector 43. The protection circuit module 40 is formed by mounting circuit elements on a printed circuit board and is configured to control the battery circuit so that the unit cells 10 can be protected from overcharge, overdischarge, overcurrent, and external shorts.

Figure 3:
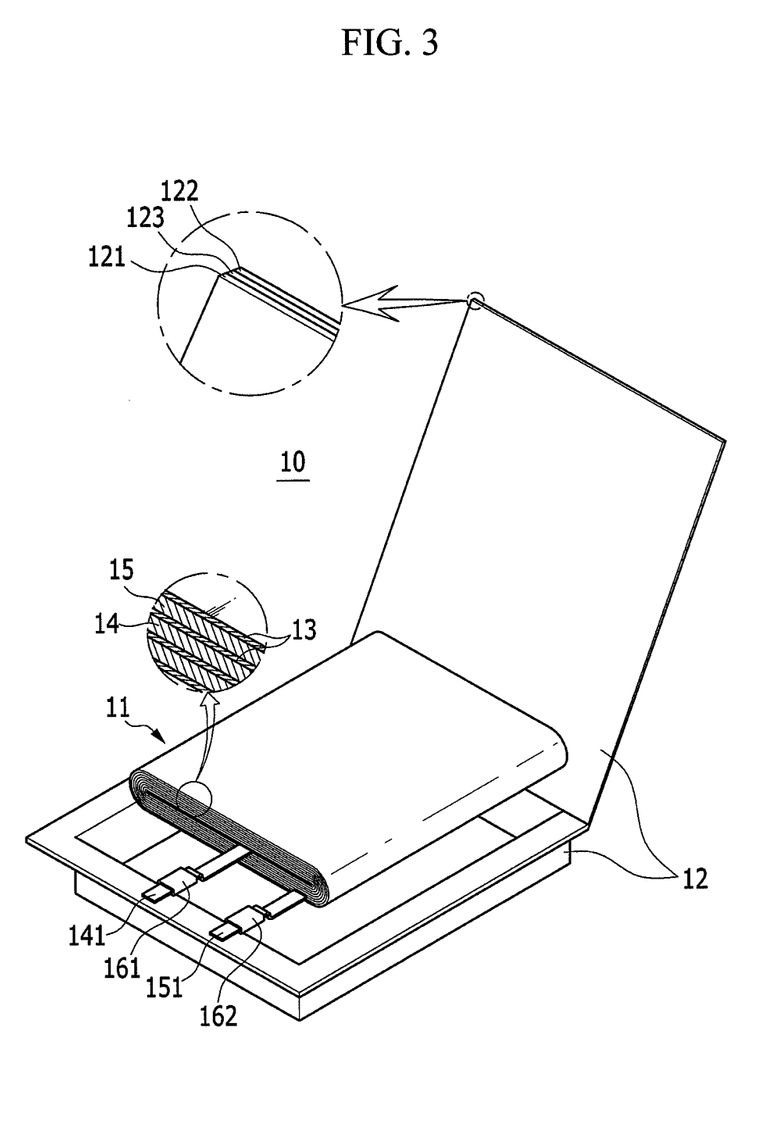
FIG. 3 is an exploded perspective view illustrating a unit cell used in FIG. 1.

FIG. 3 is an exploded perspective view illustrating a unit cell 10 used in FIG. 1. Referring to FIG. 3, the unit cell 10 may be a pouch-type electrochemical cell in a rechargeable battery. In a pouch-type rechargeable battery, the battery material may be stored within an enclosure or pouch having electrodes protruding therefrom. The unit cell 10 includes an electrode assembly 11 that performs recharging and discharging operations and a pouch 12 which houses the electrode assembly 11.

The electrode assembly 11 is a jelly roll-type in which a separator 13 is sandwiched between a positive electrode 14 and a negative electrode 15. The positive electrode 14 and the negative electrode 15 are wound. As an example, the separator 13 may be formed of a polymer film capable of passing lithium ions.

The positive electrode 14 includes a coating portion having an active material to a current collector of a metal thin film, and an uncoated portion connected to an exposed current collector, without the active material. For example, the positive electrode 14 is formed of an aluminum thin film. A positive electrode lead tab 141 is connected to the uncoated portion of the positive electrode 14.

The negative electrode 15 includes a coating portion having an active material different from the active material of the positive electrode 14 on the current collector of the metal thin film, and an uncoated portion set to the exposed current collector. In some embodiments, the negative electrode 15 is formed of a copper thin film. A negative electrode lead tab 151 is separated from the positive electrode lead tab 141 and then connected to the uncoated portion of the negative electrode 15.

The pouch 12 has an one side that has a concave shape and the other side that is flat so as to create a space to house the electrode assembly 11. The pouch 12 encloses the electrode assembly 11 and can be sealed by heat-welding a border opposed to each other.

The pouch 12 is formed as a multi-layered sheet structure, and includes a polymer sheet 121 that forms an inner surface and acts for insulation and heat-welding, a PET (polyethyleneterephthalate) sheet that forms an outer surface and acts for protection, and nylon sheet or PET-nylon composite sheet 122, for example.

In addition, the pouch 12 includes a metal sheet 123 that is provided between the polymer sheet 121 and the PET-nylon composite sheet 122 to provide a mechanical strength. As an example, the metal sheet 123 may be an aluminum sheet.

In some embodiments, the positive electrode lead tab 141 and the negative electrode lead tab 151 extend out in the same side of the electrode assembly 11. Insulating members 161 and 162 are connected to the positive and negative lead electrode tabs 141 and 151, and electrically insulate the positive and negative electrode lead tabs 141 and 151. The insulating members 161 and 162 coat the positive and negative electrode lead tabs 141 and 151 on the pouch 20 so that the insulating properties between the positive and negative electrode lead tabs 141 and 151 are increased. in some embodiments, the positive electrode lead tab 141 and the negative electrode lead tab 151 extend out of the same side of the pouch 12 that is heat-welded, the electrode assembly 11 may be electrically connected to the outside of the pouch 12.

Figure 4:
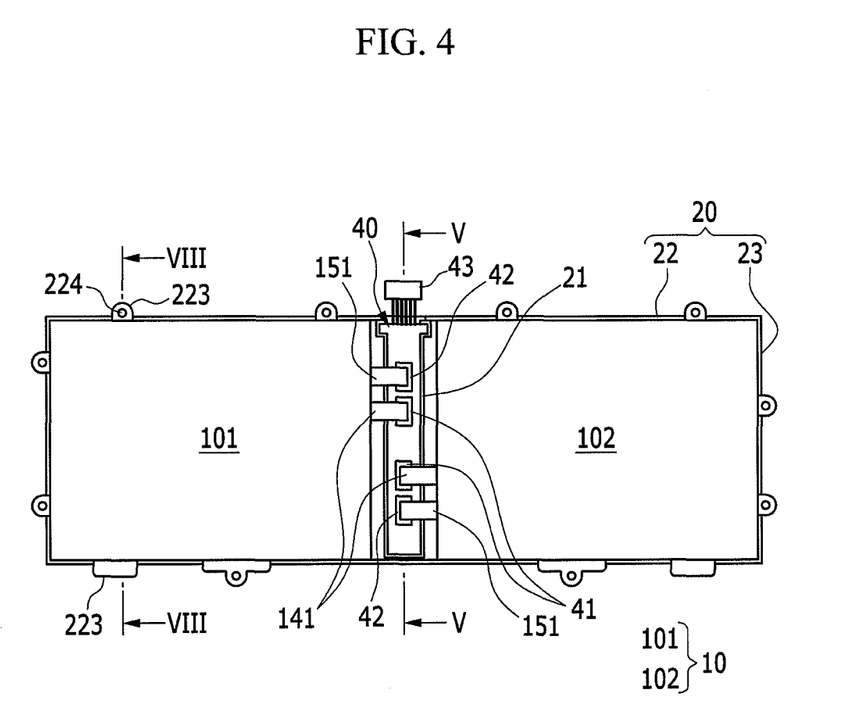
FIG. 4 is a top plan view illustrating a rechargeable battery pack of FIG. 1.
Figure 5:
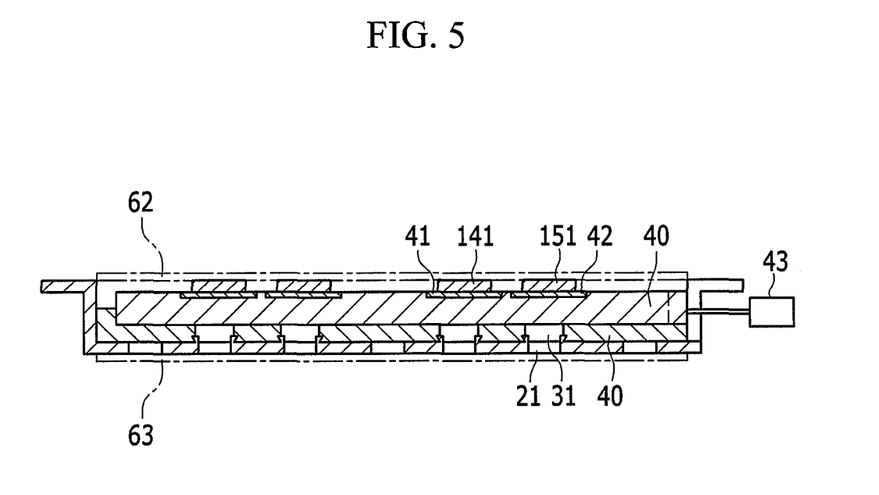
FIG. 5 is a cross-sectional view taken along a line V-V in FIG. 4.

FIG. 4 is a top plan view illustrating a rechargeable battery pack of FIG. 1, and FIG. 5 is a cross-sectional view taken along a line V-V in FIG. 4. Referring to FIGS. 4 and 5, and as described above, one side of the protection circuit module 40 is provided with positive and negative electrode tab connection portions 41 and 42 connecting the positive and negative electrode lead tab 141 and 151.

The plurality of second through holes 31 provided on the holder 30 are correspondingly formed and disposed on the holder 30 to correspond to the positive and negative electrode tab connection portions 41 and 42 of the protection circuit module 40. The through holes to enable the handling or insertion of welding instruments through the second through holes 31.

In some embodiments, the first and second unit cells 101 and 102 are symmetrically disposed on both sides of the loading portion 21. The lead tabs of the first and second unit cells 101 and 102 are disposed in order of negative, positive, positive, negative electrode lead tab, e.g., 151, 141, 141 and 151. In this order, the tab connection portion of the protection circuit module 40 is disposed in order of negative, positive, positive and negative electrode tab connection portion, e.g., 42, 41, 41 and 42.

Figure 6:
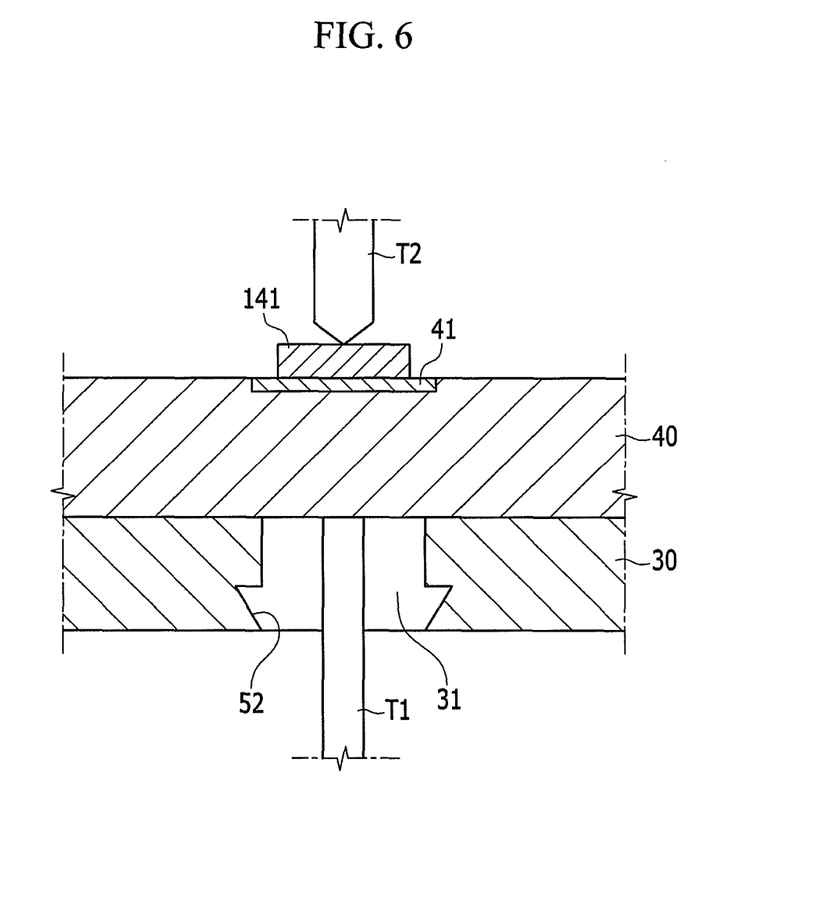
FIG. 6 is a cross-sectional view illustrating a state where a lead tab of a unit cell is welded to a protection circuit module.

FIG. 6 is a cross-sectional view illustrating a lead tabs of the unit cells welded to a protection circuit module 40. Referring to FIG. 6, a lower welding instrument T1 may be inserted through the second through holes 31 of the holder 30. Where the lower welding instrument T1 is in contact with the protection circuit module 40, the positive electrode lead tab 141 is in contact with the positive electrode tab connection portion 41, and is contacted by an upper welding instrument T2. Thus, the positive electrode tab connection portion 41 and the positive electrode lead tab 141 may be processed by resistance welding to each other.

Figure 7:
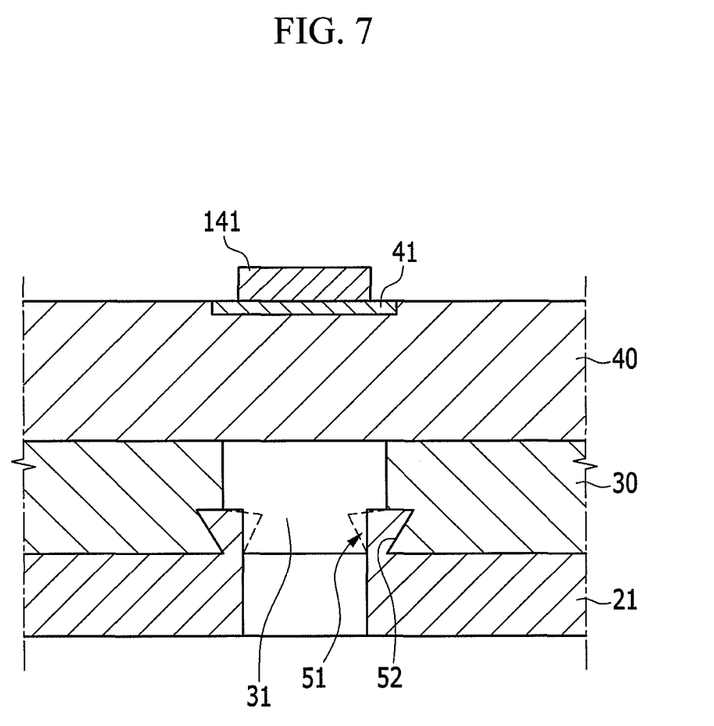
FIG. 7 is a cross-sectional view illustrating a state where a holder is coupled to a loading portion.

FIG. 7 is a cross-sectional view illustrating the holder 30 coupled to the loading portion 21. Referring to FIG. 7, the loading portion 21 of the frame 20 includes locking protrusions 51 which protrudes toward one side of the first through hole 211. The holder 30 includes a concave locking grooves 52 corresponding to the locking protrusion 51 on one side of the second through hole 31.

The locking protrusion 51 can be integrally formed in the loading portion 21 of the frame 20, and can have elasticity in the diametric direction of the first through hole 211. Thus, when the holder 30 is pressurized from an upper side of the loading portion 21, the holder 30 descends flexing the locking protrusion 51 away from the locking grooves 52 in the diametric direction of the first through hole 211. When the holder 30 is in contacted with the loading portion 21, the locking protrusion 51 is restored by its own elastic force and is fastened to the locking groove 52.

The locking protrusions 51 are formed so as to approximate the first through holes 211, and the locking grooves 52 are formed in proximity, or surrounding the second through holes 31. In some embodiments, the first through holes 211 and the second through holes 31 are formed to correspond to each other. Thus, since the plurality of locking protrusions 51 and the plurality of locking grooves 52 are fastened to each other, the holder 30 and the loading portion 21 are securely retained and held together.

Figure 8:
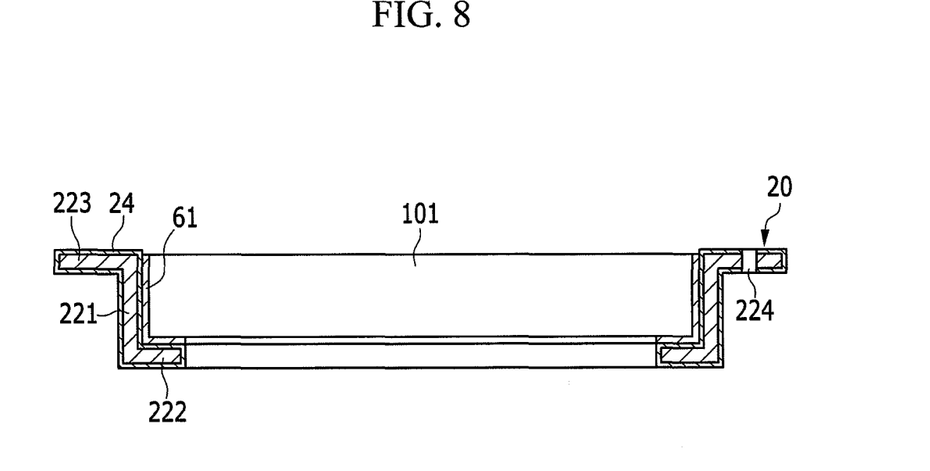
FIG. 8 is a cross-sectional view taken along a line VIII-VIII in FIG. 4.

FIG. 8 is a cross-sectional view taken along a line VIII-VIII in FIG. 4. Referring to FIG. 8, a coating layer 24 of an insulating material may be formed on the external surface of the frame 20. The coating layer 24 can electrically insulate between the unit cells 10 and the frame 20.

A cross-sectional structure of the frame 20, along the long side 22 of the frame 20 will be described. The long side 22 includes a side portion 221 to support a side surface of the first unit cell 101, a supporting portion 222 protruding from the side portion 221 toward the inner side to support a side surface of the first unit cell 101, and a set installing portion 223 protruded from the side portion 221 toward the outer side and installed in the set of an electric or electronic device.

The side portion 221 and the supporting portion 222 correspond to portions which support the first unit cell 101, and are portions to bear the load of the first unit cell 101. At least one of the side portion 221 and the supporting portion 222 is provided with a double-sided adhesive tape 61. The double-sided adhesive tape 61 is interposed between one side of the side portion 221 and the supporting portion 222 and the first unit cell 101.

The set installing portion 223 of the frame 20 can be variously formed depending on the structure of the set. For example, the set installing portion 223 may be formed as a flange, or may be provided with a screw hole 224 to the flange. Since the set installing portion 223 is formed of a metal material, when the screw is fastened to the set of the electronic device via the screw hole 224, damage of the set installing portion 223 can be prevented.

Referring again to FIGS. 1 and 5, where the first unit cell 101 and the second unit cell 102 are symmetrically installed into the both sides of the loading portion 21, the both sides of the loading portion 21 can be coated by insulating tapes 62 and 63.

The upper insulating tape 62 can be attached to the first unit cell 101 and the second unit cell to form an insulating structure by coating positive and negative electrode lead tabs 141 and 151 and the protection circuit module 40. Since the loading portion 21 is coated by the lower insulating tape 63 and the first through hole 211 is closed and sealed, it is possible to prevent short-circuits due to the penetration of foreign materials.

Where the first and second unit cells 101 and 102 are installed into the frame 20, a finishing tape 64 can be attached to surround outlines of the first and second unit cells 101 and 102, and the long side 22 and short side 23 of the frame 20 to form a tablet type rechargeable battery pack.

Referring to FIG. 1, the finishing tape 64 can be formed by cutting a portion corresponding to the set installing portion 223 so as not to be attached to the set installing portion 223. The long side 22 and short side 23 of the frame 20 accommodate the finishing tape 64 into the groove 65 to minimize protruding toward both sides of the frame 20 by the finishing tape. Thus, the increase in the thickness of the rechargeable battery pack can be minimized.

While this invention has been described in connection with preferred embodiments, it is obvious that the invention is not limited to the preferred embodiments, but, on the contrary, is intended to conduct various modifications within the spirit and scope of the appended claims, the detailed description and the accompanying drawings and to belong to the range of the present invention.

What is claimed is:

1. A rechargeable battery pack, comprising:
a plurality of unit cells;
a frame comprising a loading portion formed thereon, the loading portion formed with a plurality of first through holes therethrough, wherein the loading portion is configured to support the plurality of unit cells, and wherein the loading portion is disposed at a junction between two of the plurality of unit cells;
an electrically insulating holder connected to the loading portion, the electrically insulating holder formed with a plurality of second through holes therethrough, wherein the plurality of first throughholes align with the plurality of second throughholes at the junction between the two of the plurality of unit cells;
a protection circuit module electrically connected to the unit cells and connected to the holder, the holder providing electrical insulation between the loading portion and the protection circuit module; and
wherein the frame has a higher strength than the holder.

2. The rechargeable battery pack of claim 1, wherein the frame is formed of a metal material, and the holder is formed of a synthetic resin material.

3. The rechargeable battery pack of claim 1, wherein the loading portion comprises a locking protrusion extending away from one of the plurality of first through holes, and wherein the holder comprises locking grooves disposed in at least one of the second through holes, the locking grooves configured to receive the locking protrusion.

4. The rechargeable battery pack of claim 1, wherein the frame comprises a layer of an insulating material.

5. The rechargeable battery pack of claim 1, wherein the frame comprises a quadrangle, having a pair of long sides parallel to each other, and a pair of short sides parallel to each other, wherein the end portions of the pair of long sides are connected to the end portions of the short sides, and the loading portion is disposed perpendicular to the pair of long sides along a center line of the quadrangle.

6. The rechargeable battery pack of claim 5, wherein the unit cells includes a first unit cell and a second unit cell each of the first unit cell and the second unit cell comprising a positive and a negative electrode lead tab, and wherein each of lead tabs of the first unit cell and the second unit cell is connected to the protection circuit module.

7. The rechargeable battery pack of claim 6, further comprising an insulating tape attached over the first unit cell and the second unit cell.

8. The rechargeable battery pack of claim 5, wherein
at least one of the long sides and at least one of the short sides comprises:
a side portion to support a side surface of one of the plurality of unit cells,
a supporting portion protruding from the side portion to support one side of one of the plurality of unit cells, and
a set installing portion protruded from the side portion toward the outer side, the set installing portion configured to install in a mobile electronic device.

9. The rechargeable battery pack of claim 8, further comprising a double-sided adhesive tape interposed between one side of the supporting portion and the side portion and the unit cell.

10. The rechargeable battery pack of claim 9, wherein the double-sided adhesive tape is contoured to be attached with the supporting portion and the side portion to one side thereof and with one surface of the first unit cell to other side thereof.

11. The rechargeable battery pack of claim 8, wherein the set installing portion includes a screw hole.

12. The rechargeable battery pack of claim 1, wherein the unit cell is a pouch type electrochemical cell.

* * * * *